US011876334B2

(12) United States Patent
Daum et al.

(10) Patent No.: US 11,876,334 B2
(45) Date of Patent: Jan. 16, 2024

(54) DEVICE FOR PROTECTING ELECTRICAL NETWORKS FROM OVERVOLTAGES OR OVERCURRENTS

(71) Applicant: DEHN SE, Neumarkt i.d. OPF (DE)

(72) Inventors: Richard Daum, Neumarkt (DE); Juliane Klose, Neumarkt (DE); Michael Waffler, Neumarkt/Opt (DE); Sebastian Haas, Weigendorf (DE); Patrick Spangler, Neumarkt (DE); Michael Weissflog, Neumarkt (DE); Dietmar Dürr, Neumarkt (DE)

(73) Assignee: DEHN SE, Neumarkt i.d. OPf. (DE)

( * ) Notice: Subject to any disclaimer, the term of this patent is extended or adjusted under 35 U.S.C. 154(b) by 538 days.

(21) Appl. No.: 17/254,533

(22) PCT Filed: Jun. 25, 2019

(86) PCT No.: PCT/EP2019/066773
§ 371 (c)(1),
(2) Date: Dec. 21, 2020

(87) PCT Pub. No.: WO2020/002295
PCT Pub. Date: Jan. 2, 2020

(65) Prior Publication Data

US 2021/0280995 A1 Sep. 9, 2021

(30) Foreign Application Priority Data

Jun. 27, 2018 (DE) ......................... 102018115483.6
Aug. 2, 2018 (DE) ......................... 102018118807.2
Jun. 14, 2019 (DE) ......................... 102019116242.4

(51) Int. Cl.
*H02H 9/00* (2006.01)
*H01R 9/24* (2006.01)

(52) U.S. Cl.
CPC ................................ *H01R 9/2441* (2013.01)

(58) Field of Classification Search
None
See application file for complete search history.

(56) References Cited

U.S. PATENT DOCUMENTS 4,209,671 A * 6/1980 Charles .................. H04M 3/30 324/133
4,922,374 A * 5/1990 Mueller .............. H01R 9/2441 361/111

(Continued)

FOREIGN PATENT DOCUMENTS

DE 31 17 532 A1 5/1982
DE 692 28 261 T2 8/1999

(Continued)

OTHER PUBLICATIONS

International Search Report corresponding to International application No. PCT/EP2019/066773 dated Sep. 26, 2019, (13 pages).

*Primary Examiner* — Stephen W Jackson
(74) *Attorney, Agent, or Firm* — Bodner & Bodner, PLLC; Gerald T. Bodner; Christian P. Bodner

(57) ABSTRACT

The invention relates to a device combination for protecting electrical networks against overvoltages or overcurrents, comprising an essentially U-shaped base and at least one plug-in module, which can be plugged or pushed onto the base, wherein the base has connection terminals for connecting to the respective network and also has plug-in contacts, which are connected to the connection terminals and are complementary to mating plug-in contacts or contact tongues of the plug-in module, and the plug-in module has a housing which accommodates one or more lightning and/or overvoltage arresters, and the mating plug-in contacts or contact tongues pass through a floor side of the housing. According to the invention, means are provided for chang- (Continued)

ing the position and the distance between the plug-in contacts and the mating plug-in contacts or contact tongues, wherein, starting from a working position, with a closed, surge-current-resistant electrical connection, it is possible to select an idle position, in which the plug-in contacts and mating plug-in contacts or contact tongues are located in an isolation/disengagement position.

14 Claims, 6 Drawing Sheets

(56) References Cited

U.S. PATENT DOCUMENTS

| | | | | |
|---|---|---|---|---|
| 2014/0009858 | A1* | 1/2014 | Suchy | H01T 4/06 361/91.1 |
| 2017/0330718 | A1* | 11/2017 | Funcheon | H01H 83/10 |

FOREIGN PATENT DOCUMENTS

| | | | |
|---|---|---|---|
| DE | 10 2005 052667 | A1 | 10/2006 |
| DE | 10 2006 006914 | A1 | 8/2007 |
| DE | 10 2008 017 423 | A1 | 10/2009 |
| DE | 20 2010 012860 | U1 | 11/2010 |
| DE | 10 2010 033 179 | A1 | 2/2012 |
| DE | 10 2014 102 733 | A1 | 9/2015 |
| DE | 20 2016 005 616 | U1 | 12/2016 |
| DE | 10 2017 129 644 | A1 | 2/2019 |

* cited by examiner

DEVICE FOR PROTECTING ELECTRICAL NETWORKS FROM OVERVOLTAGES OR OVERCURRENTS

PRIORITY CLAIM

This application is a 35 U.S.C. 371 National Stage application of PCT/EP2019/066773, filed Jun. 25, 2019, and claims priority to German Application Nos. DE10 2018 115483.6, filed on Jun. 27, 2018; DE10 2018 118807.2, filed on Aug. 2, 2018; and DE10 2019 116242.4, filed on Jun. 14, 2019. The entire contents of the above-mentioned patent applications are incorporated herein by reference as part of the disclosure of this U.S. application.

BACKGROUND

The invention relates to a device combination for protecting electrical networks against overvoltages or overcurrents, comprising an essentially U-shaped base and at least one plug-in module, which can be plugged or pushed onto the base, wherein the base has connection terminals for connecting to the respective network and also has plug-in contacts, which are connected to the connection terminals and are complementary to mating plug-in contacts or contact tongues of the plug-in module, and the plug-in module has a housing which accommodates one or more lightning and/or overvoltage arresters, and the mating plug-in contacts or contact tongues pass through a floor side of the housing, according to the preamble of claim 1.

Overvoltage arresters, designed in the form of a device combination comprising a base and plug-in parts, which are accommodated by the base and accommodate the actual overvoltage-arrester elements, have been found in the prior art for many years now.

The design of known device combinations comprising a base and plug-in part has to ensure a reliable electrical plug-in connection in all operating conditions and over a long period of time. In addition, it has to be possible, in the event of maintenance or of malfunctioning, for the plug-in part to be removed where possible without tools being required and to be replaced by a new part.

For measuring and testing purposes as well, it is often necessary for the plug-in part or parts to be removed from the base and then re-inserted.

Previously known device combinations comprising a base and plug-in part are based on the premise that the plug-in part is regularly pushed into the opening of the corresponding U-shaped base from above and then transferred into a latching position.

In certain assembly conditions, however, free accessibility of the plug-in parts from above is not always ensured, and therefore it is necessary, in principle, for it also to be possible for a plug-in part to be pushed laterally into a base.

Furthermore, it is often required for it to be possible for the plug-in part to be transferred into an isolation position, to be precise without there being any need for the plug-in part to be completely removed from the base.

In principle, the permanent, correct supply of power is of utmost importance for the operational reliability of electrical machines, systems and devices. In order to prevent system standstill, or to keep the risk of damage to an electrical network, or to a load connected to the network, to a low level, damage to the network and to the loads as a result of overvoltages or overcurrents has to be prevented on a permanent basis.

The known overvoltage arresters are active in the event of overvoltages or overload and are capable of dissipating transient overvoltages or of switching of a defective circuit.

As already mentioned in the introduction, overvoltage arresters are frequently realized in the form of plug-in device combinations, a base forming a lower part and a plug-in module forming an upper part.

In the event of malfunctioning or of overload, it is possible for a surge current or short-circuit current, which exceeds the customary weighted current of the network by a multiple, to flow for a short period. High short-circuit currents result in pronounced magnetic forces which, in some circumstances, give rise to the actual overvoltage element being forced out of the base part.

In order to address these problems, the plug-in contacts and mating plug-in contacts or contact tongues can be designed such that, in the plugged-in state, not just a force fit, but also a form fit, has been achieved between them.

Problematic in such a case, however, are the large forces which are present when the plug-in module is being pulled out of the base.

In this respect, DE 10 2008 017 423 A1 has proposed to develop an overvoltage arrester such that, with previous outer dimensions of the base part and plug part being maintained, on the one hand a releasable plug part is formed which has a plug-in connection between the base part and the plug part, said plug-in connection being required for the electrical connection, and on the other hand it is possible to prevent the release of the plug part in the base part under tough working conditions, wherein it should be possible to check the fit of the plug part by visual or optical means.

A fastening device in the form of a turning lock for the corresponding mating opening in the form of the groove is proposed here, said fastening device, in the form of an easy-to-operate turning lock which can be released by means of the screw driver, being arranged in the base part and establishing a form-fitting connection and locking between the base part and plug part.

The fastening device, in the form of a turning lock, between the base part and the plug part prevents the situation where a plug part is accidentally pulled out of the base part and likewise ensures the firm fit of the contact connections between the plug sockets of the base part and the corresponding pins of the plug part. The firm fit of the contact connections is achieved in that, in the locking position, the fastening device engages simultaneously in the base part and plug part and thus ensures a form fit between the two elements. For the activation of the turning lock, the head part of the lock contains a profile which is suitable for accommodating a tool.

The solution with the turning lock according to DE 10 2008 017 423 A1 does, indeed, allow the plug-in part to be fixed in the base part as a result of the arresting function achieved, but this locking position is ensured only when the plug-in part is in a defined end position in relation to the base part. In addition, the pull-out forces continue to be high. There is no possibility, in the outlined solution of the prior art, of a plug-in part being pushed laterally into a base part. It is also the case that isolation cannot take place without the plug-in part being completely removed.

Proceeding from the above, it is the object of the invention to specify a further-developed device combination which is intended for protecting electrical networks against overvoltage or overcurrents and comprises a U-shaped base and at least one plug-in module, which can be plugged or pushed onto the base, wherein the device combination is intended to allow defined isolation with the plug-in module remaining in the base and it is possible, in principle, for the plug-in module to be fixed in more or less any desired position in a fully plugged-in state, but also a partially plugged-in state, in relation to the U-shaped base.

The object of the invention is achieved by the combination of features in patent claim 1, the dependent claims presenting at least expedient configurations and developments.

Accordingly, the invention proceeds from a device combination for protecting electrical networks against overvoltage or overcurrents. These can be transient, but also temporary overvoltages.

The device combination comprises an essentially U-shaped base, which is known per se, and at least one plug-in module, which can be plugged or pushed onto the base. The base has connection terminals which connect into the respective network and also has plug-in contacts, which are connected to the connection terminals.

These plug-in contacts are complementary to mating plug-in contacts or contact tongues of the plug-in module.

The plug-in module has a housing which accommodates one or more lightning and/or overvoltage arresters. The mating plug-in contacts or the contact tongues pass through a floor side of the housing such that it is possible to establish reliable connection to the plug-in contacts in the base.

The components contained in the plug-in module can likewise be constituted by a switch/spark-gap combination, in which case the device combination can also be operated without fuses.

Means according to the invention for changing the position and the distance between the plug-in contacts and mating plug-in contacts or contact tongues are provided.

These means make it possible, starting from a working position, and with a closed, surge-current-resistant electrical connection, to select an idle position, in which the plug-in contacts and mating plug-in contacts or contact tongues are located in an isolation/disengagement position. In this isolation and disengagement position, the necessary electrical separation distance has been ensured. At the same time, this ensures that the necessary creepage distances and clearances are observed. When the idle position is reached, however, the plug-in module is still retained on the base or fixed on the same.

If desired, starting from the idle position, the plug-in module can be removed by a very small amount of mechanical force being applied, and changed over, measured or checked. Since, in the idle position, the electrical contact connection has already been released, only the aforementioned small amount of force is required in order for the plug-in module to be completely removed. This removal operation can take place in a tool-free manner.

In one embodiment of the invention, the plug-in module can be rotated or pivoted about its central axis.

It is then possible to make a selection between the working position and the idle position with the aid of the pivoting or rotary movement. If the working position has been selected, the mating plug-in contacts or contact tongues of the plug-in module engage in correspondingly configured plug-in contacts of the base. It is possible here for the configuration of the contacts, that is to say the shaping, to be such that electromagnetic forces which occur in the event of a surge current are oriented so as to increase the contact force between the respective contact elements. Transfer into the idle position by way of a rotary or pivoting movement directed counter to that for the working position results in the contact connections being releasable, to be precise if the aforementioned separation distances and the necessary creepage distances and clearances being observed in the process.

Proceeding from the idle position, the relevant plug-in module is still fixed mechanically in the base, but can be removed by a small amount of force being applied. Depending on the configuration of the housing of the plug-in module, removal can take place in the upward direction, but also by being pushed laterally out of the base.

A further configuration of the invention is based on the fact that a pneumatically or hydraulically activated ram, a corresponding pneumatically or hydraulically activated pad or a relevant lever is arranged between the plug-in module, or the housing thereof, and the base, in order to effect a change in the distance between contacts, that is to say to make a selection between the working position and idle position. If, for example, a pneumatically activatable pad is located between the plug-in module and the base, then pressure being applied to the pad can result in a force acting between the plug-in module and base, with the result that the plug-in module moves away from the base and is more or less lifted out until the envisaged idle position is reached. As long as the application of pressure to the pad, the ram or the corresponding lever is maintained, it is also the case that the plug-in module cannot accidentally move back into the base, which increases the level of electrical safety when corresponding work is being carried out on live equipment, and therefore increases the work safety.

According to the invention, in an additional embodiment, a spindle for converting a rotary movement into a longitudinal movement is arranged between the U-shaped base and the plug-in module.

This arrangement is achieved in that the plug-in module can be moved in the direction of the U-shaped base, but also away from the same, and is retained in a respective position.

This makes it possible both to establish a reliable electrical plug-in connection between the plug-in contacts and the mating plug-in contacts and to effect defined isolation by way of contact separation.

If isolation is desired, the spindle is made to rotate such that the plug-in module moves out of the U-shaped base. This movement takes place until a sufficient separation distance has been achieved between the plug-in contacts and the mating plug-in contacts or contact tongues. When the relevant separation or isolation position is reached, the spindle remains in engagement with a threaded bore which is located in the base floor and of which the thread is realized in a manner complementary to the thread of the spindle.

It is only when the spindle moves further that the relevant spindle end passes out of the threaded before and the plug-in module can be removed from the base easily, without any force being applied.

According to the invention, the spindle is mounted in a rotatable manner in the plug-in module and is accessible from the upper side of the plug-in module, wherein the aforementioned threaded bore which complements the spindle is arranged in the base.

In the case of an alternative solution, the spindle can be mounted in a rotatable manner in the base, wherein the threaded bore which complements the spindle is located in the floor, that is to say in the underside, of the plug-in module.

According to the invention, at least one of the side surfaces of the plug-in module which are oriented toward the U-shaped base has a guide groove, which is complementary to a guide protrusion or a guide rail on at least one side wall of the U-shaped base.

The side wall under consideration here is that which is located opposite the plug-in module when the latter is being pushed in.

According to the invention, the guide protrusion or the guide rail is mounted resiliently or inserted resiliently in the side wall, and therefore, when the plug-in module moves in the direction of the base floor or upward from the base floor, the guide protrusion or the guide rail is displaced in the direction of the side wall and, when it reaches a congruent position in relation to the guide groove in the plug-in module, the guide protrusion or guide rail enters into said groove. The congruent position coincides preferably with the necessary separation distance for isolation of the plug-in module in relation to the base.

According to the invention, the change in position of the guide protrusion or of the guide rail can be seen in a viewing window in the base.

If a rotary movement of the spindle, preferably with the aid of a tool, causes the plug-in module to be displaced in the release direction, a corresponding longitudinal movement of the plug-in module in relation to the base causes the resiliently prestressed and resiliently mounted guide rail to enter into the corresponding groove in the plug-in module, and thus results in a noticeable arresting action. This moment of entry can be seen in the viewing window, for example of a way of change in color, on account of the movement of the guide rail. The technician or system operator can then readily ascertain that the plug-in module is in an isolated state.

If rotary movement, and consequential longitudinal movement, continues until the spindle passes out of the associated threaded bore, the plug-in part can ultimately be removed from the base. The steps for inserting the plug-in module into the base take place in reverse order.

When the plug-in module reaches a position within the base which is defined by the guide protrusion or the guide rail entering into the guide groove, the desired contact separation has therefore been achieved.

According to the invention, it is also possible for the plug-in module to be pushed laterally into the U-shaped base using the guide groove and the guide protrusion or the guide rail and then, by means of the spindle, for the plug-in module to move in the direction of the base floor for contact-making purposes.

To develop this, the lateral pushing action can be delimited by a fixed or releasable stop, which is located in or on the base. This action of the stop ensures that the correct position desired between the plug-in contacts and the mating plug-in contacts is achieved before the plug-in module moves in the direction of the base floor for contact-making purposes.

The stop or stops is or are designed in the form of lateral delimiting walls which can be pushed into the base, wherein in one configuration, on the upper side, the delimiting walls each have a central slope for easier introduction of the plug-in module from above in the direction of the base.

In one configuration of the invention, a first viewing window can be formed in the plug-in direction of the plug-in module and a second viewing window can be formed in the pushing-in direction of the plug-in module, so that it can also be seen more or less from the end sides whether an isolated state of the plug-in module has been achieved or not.

It is also possible for guide recesses to be provided on the floor side of the plug-in module, said guide recesses being complementary to a respective guide protuberance or a guide nose extending upward from the floor of the U-shaped base part, that is to say in the direction of the plug-in module. This is intended to prevent skewing or tilting when the plug-in module is being inserted into the base.

The invention will be explained in more detail hereinbelow with reference to an exemplary embodiment and with the aid of the figures, in which.

Figure 12:
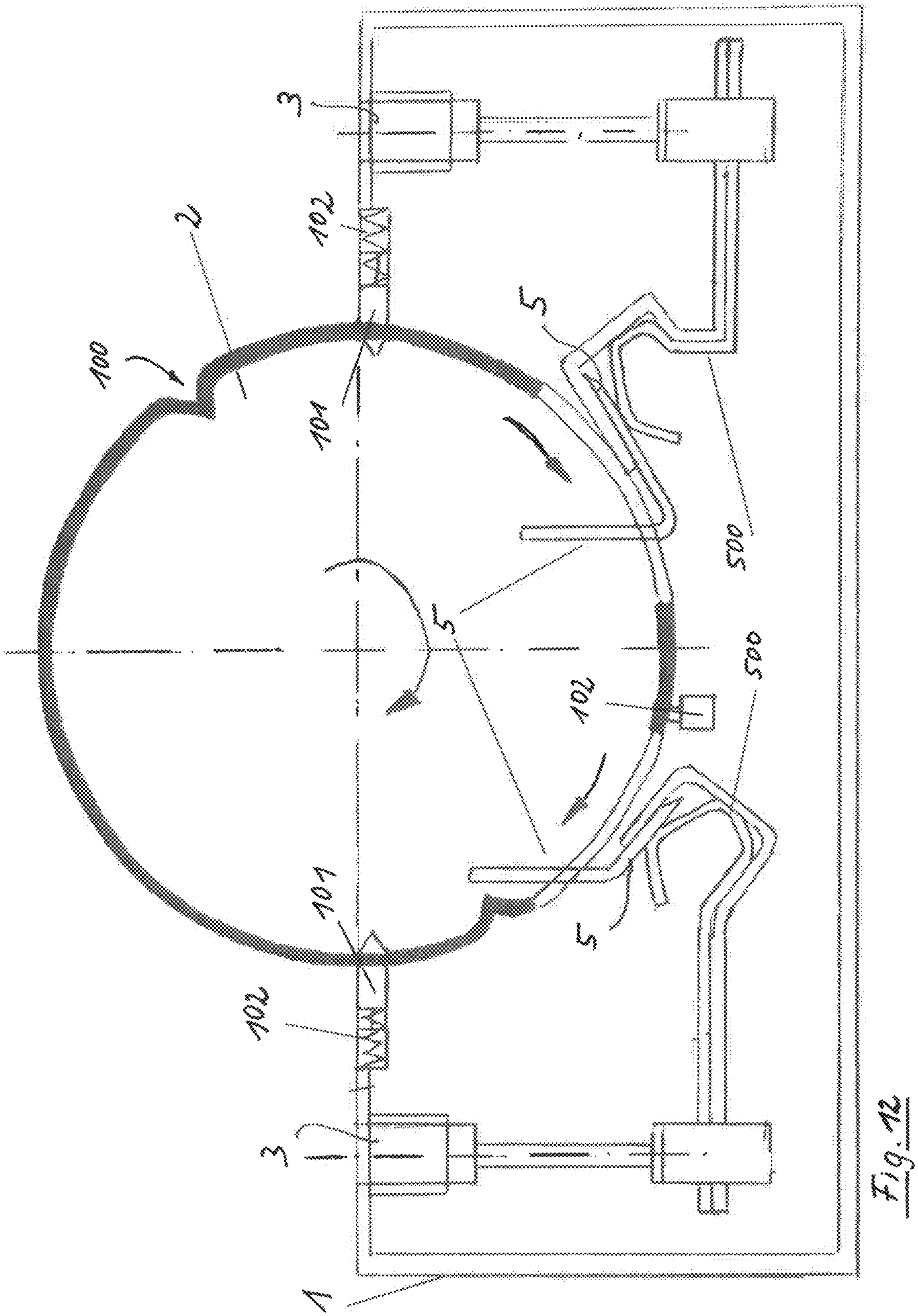
Figure 13:
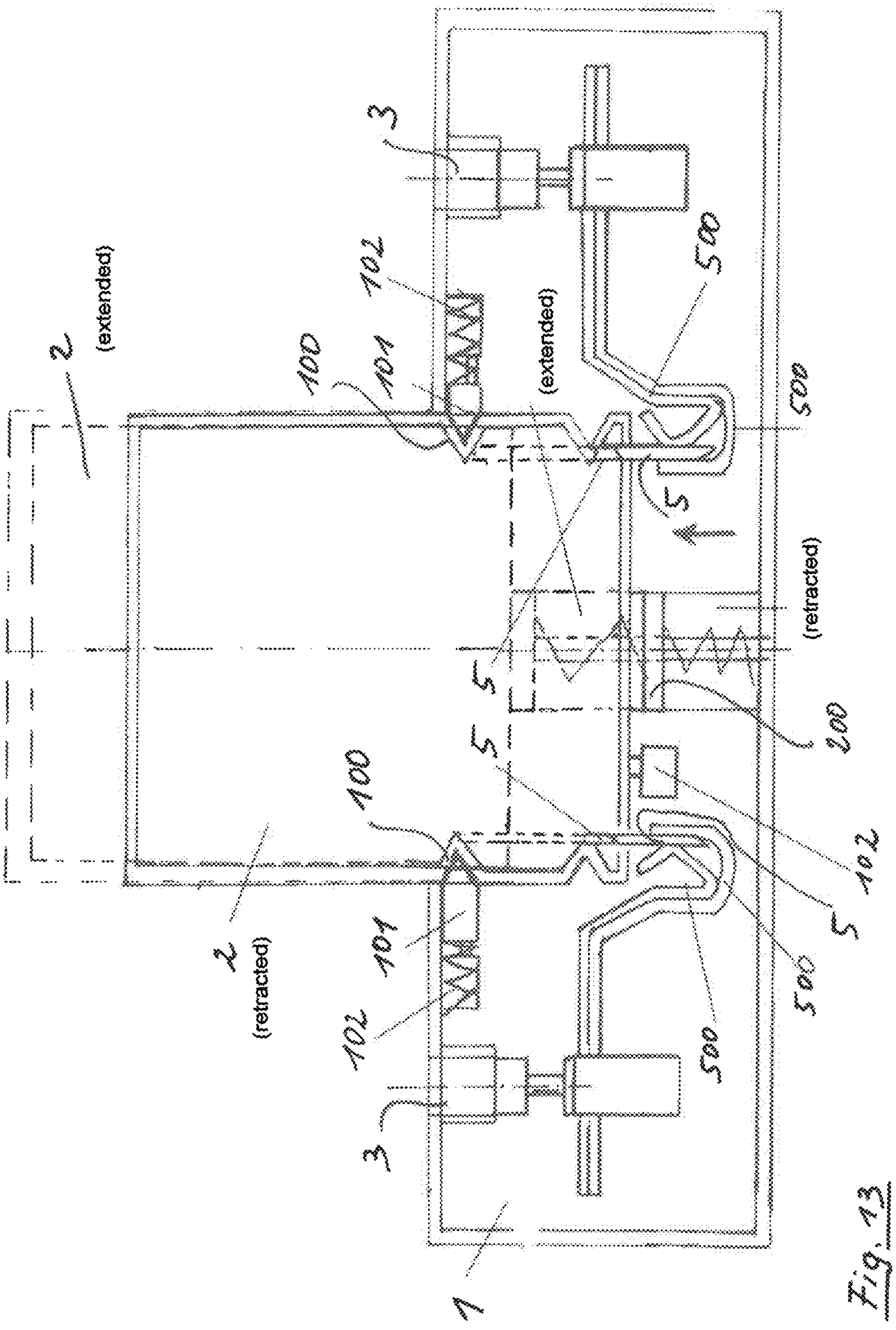

FIG. 12 shows a cross-sectional illustration through a device combination comprising a base and a plug-in module, which can be fixed in the base and can be rotated or pivoted about its axis, the device combination being illustrated in the working position with closed contact connections, wherein the arrows symbolize the direction of the rotary or pivoting movement which is necessary in order to reach the idle position, that is to say the isolation/disengagement position; and FIG. 13 shows illustrations of a further embodiment of the teaching according to the invention with hydraulically activatable means in order to bring about a change in the contact distance between the relevant element in the base and in the plug-in module, that is to say in order to effect a change from the working position in the direction of the idle position.

The device combination which is illustrated in the figures for protecting electrical networks against overvoltages or overcurrents is based on a base 1 and at least one plug-in module 2, which can be plugged or pushed onto the base.

The base 1 has connection terminals 3 for connecting to the respective network not illustrated in the figures.

Also present in the base are plug-in contacts, which are connected to the connection terminals and are located behind and/or beneath slot-like openings 4 in the floor region of the base 1.

The plug-in contacts in the base 1 are complementary to mating plug-in contacts of the plug-in module 2, said mating plug-in contacts being designed in the form of contact tongues 5.

The plug-in module 2 comprises a housing, which in its interior accommodates one or more lightning and/or overvoltage arresters.

As can be seen from the figures, the contact tongues 5 pass through a side portion or a side/floor portion of the plug-in module 2.

Figure 4:
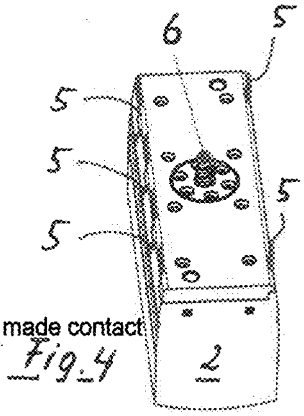
FIG. 4 shows a perspective illustration of the plug-in module with a view of the underside and spindle, which is evident there.

A spindle 6 (see FIG. 4) acts between the base 1 and the plug-in module 2 and serves to convert a rotary movement into a longitudinal movement such that, depending on the direction of rotation of the spindle, the plug-in module 2 can be moved in the direction of the base 1, and away from the same, and is retained in the respective position.

This can both establish a reliable electrical plug-in connection between the plug-in contacts and the mating plug-in contacts and effect defined isolation by way of these contacts being separated.

In this respect, the spindle 6 is mounted in a rotatable manner in the plug-in module 2 and is accessible from the upper side 20 of the plug-in module 2. It is also possible for the spindle to have, on its upper side, a screw head, a polygonal head or a similar head formation 21 for accommodating a tool.

Figure 11:
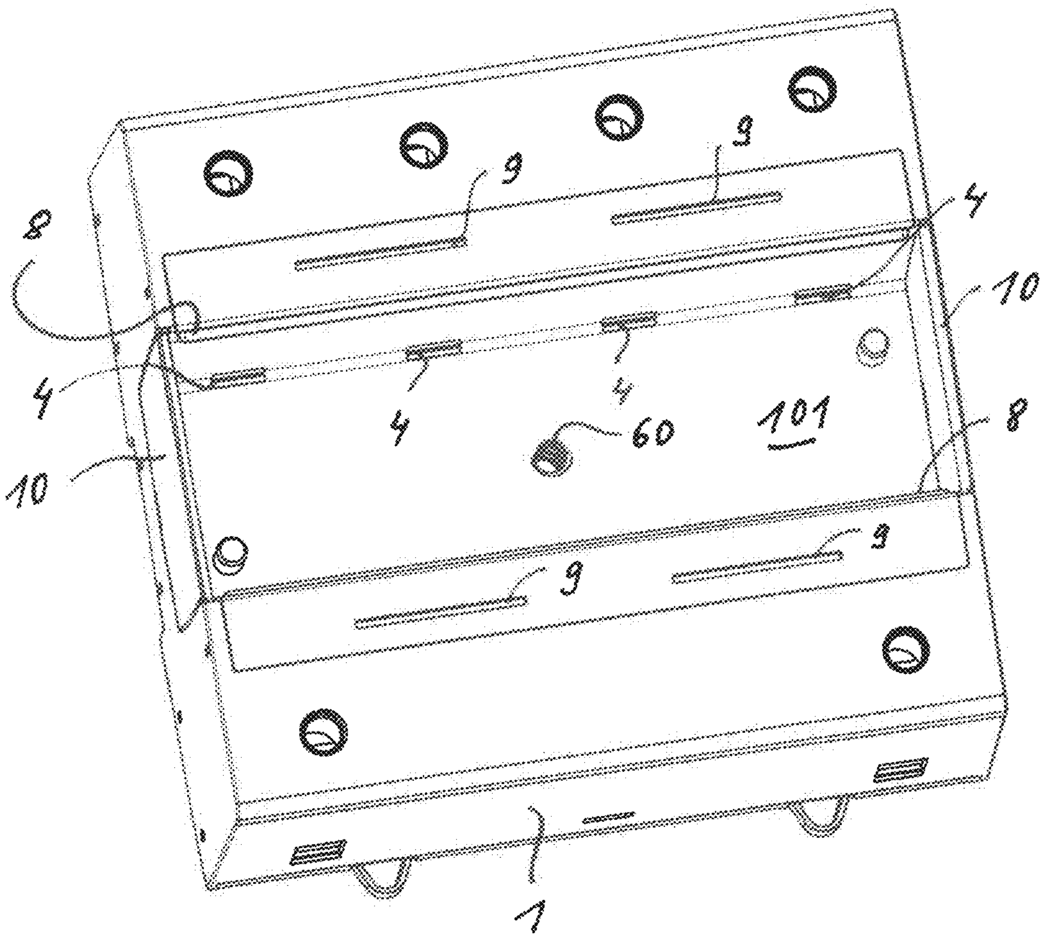
FIG. 11 shows a perspective plan view of the base with threaded bore 60.

According to FIG. 11, a threaded bore 60 which complements the spindle 6 is arranged in the base, in the region between the limbs of the U shape, that is to say in the base floor 101.

It is noted that the variant presented according to the exemplary embodiment is based on the spindle 6 with head 21 being formed in the plug-in part 2 and the associated threaded bore being arranged in the base 1. A kinematic reversal of this is also possible, in principle, without departing from the basic concepts of the invention.

At least one of the side surfaces 22 of the plug-in module 2 has a guide groove 7.

In the examples shown, there are two guide grooves 7 located opposite one another the side walls.

These guide grooves 7 are complementary to guide rails 8, which are mounted resiliently in the base in the region of the side walls 100 of the base 1.

As a result of guide protrusions or the guide rails 8, which are mounted resiliently or inserted resiliently in the side wall 100, it is the case that, when the plug-in module 2 moves in the direction of the base floor 101 or upward away from the base floor 101, the guide rails 8 can be displaced in the direction of the side wall 100 and penetrate at least partially into the same.

When a congruent position is reached between the guide grooves 7 in the plug-in module 2, the respective guide rails 8 enter into the corresponding groove 7. As a result, the plug-in module 2 is retained in relation to the base 1, wherein the change in position of the guide rails 8 can be seen in a viewing position 9 in the base 1.

Figure 2:
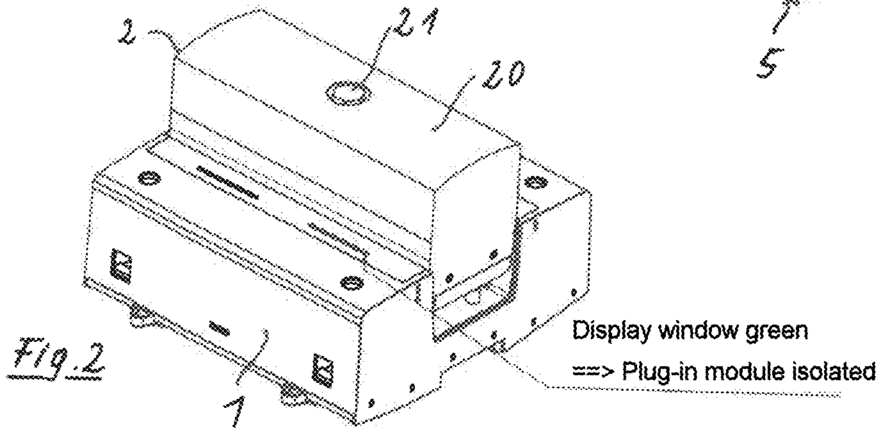
Figure 6:
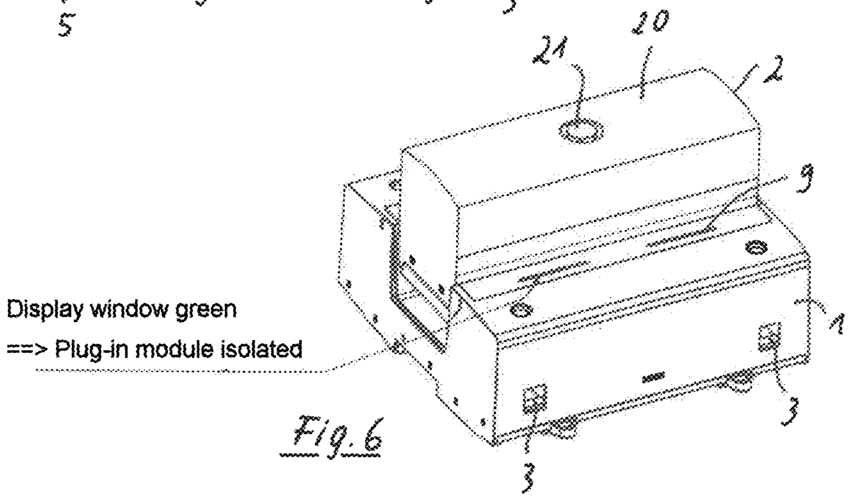
Figure 9:
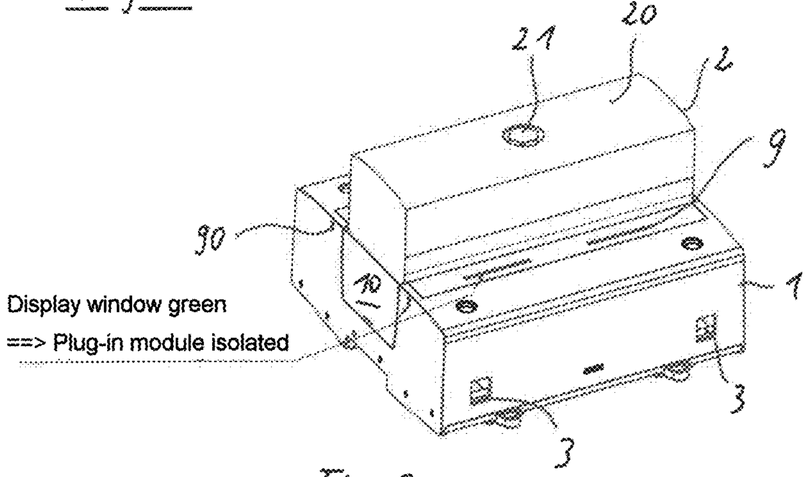

When the plug-in module 2 reaches a position within the base 1 which is defined by the guide rails 8 entering into the respective guide groove 7, the contacts 5 are located in an isolation position in relation to the contacts located in the base, that is to say contact separation has been achieved. This is shown in FIGS. 2, 6 and 9.

Starting from this contact-separation position, the spindle 6 with head 21 can be used to convert a rotary movement into a longitudinal movement. In this respect, the plug-in module 2 is pulled into the base 1 and more or less screwed to the same. In the end position of the plug-in module 2 in relation to the U-shaped base 1, the desired electrical contact safety and reliable mechanical fixing has been achieved.

Figure 3:
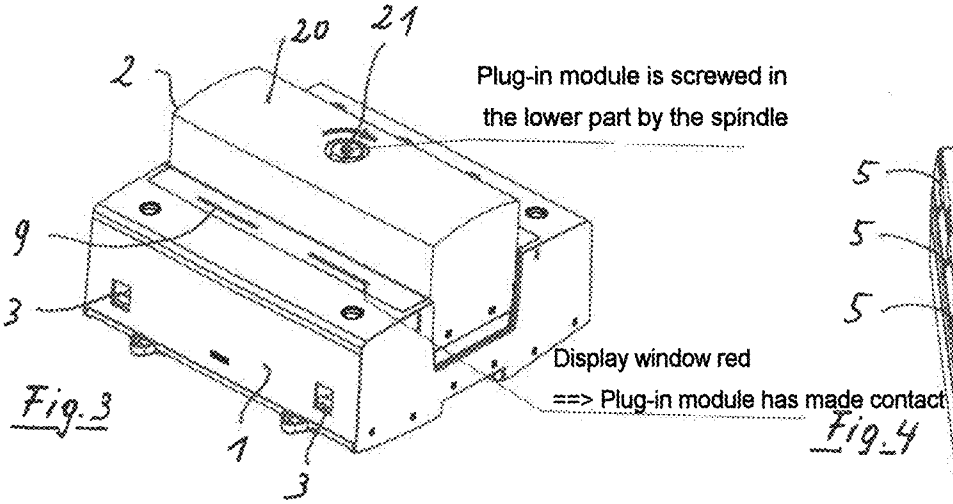

During movement counter to the direction of rotation shown by the arrows according to FIG. 3, the plug-in module 2 can be moved out of the U-shaped base 1 again without any force being applied.

Figure 7:
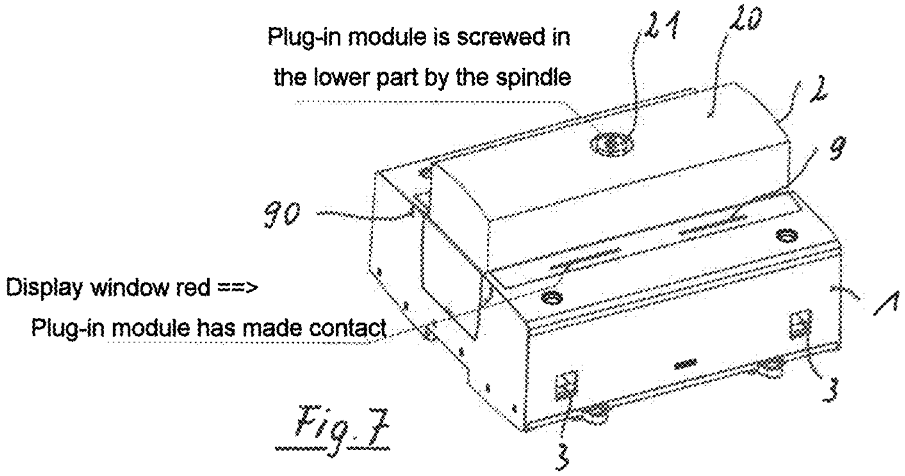
Figure 10:
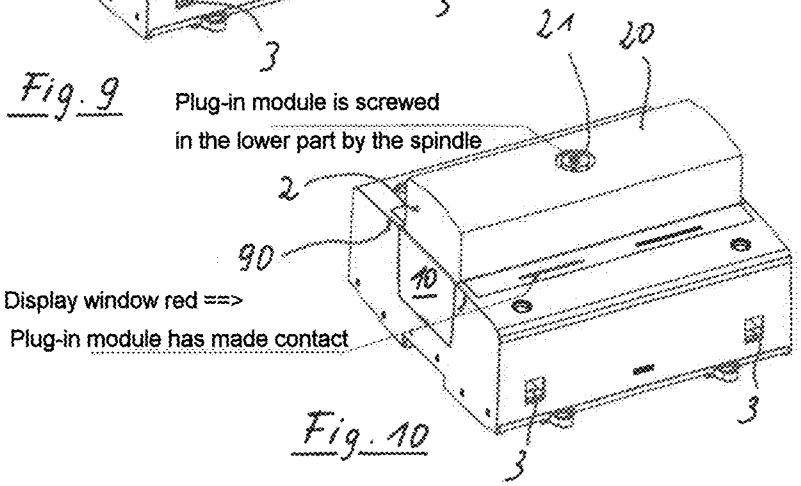

When full contact connection has been established according to FIGS. 3, 7 and 10, the display in the viewing window 9 changes, for example from originally green (isolated) to red (plug-in module has made contact).

Figure 1:
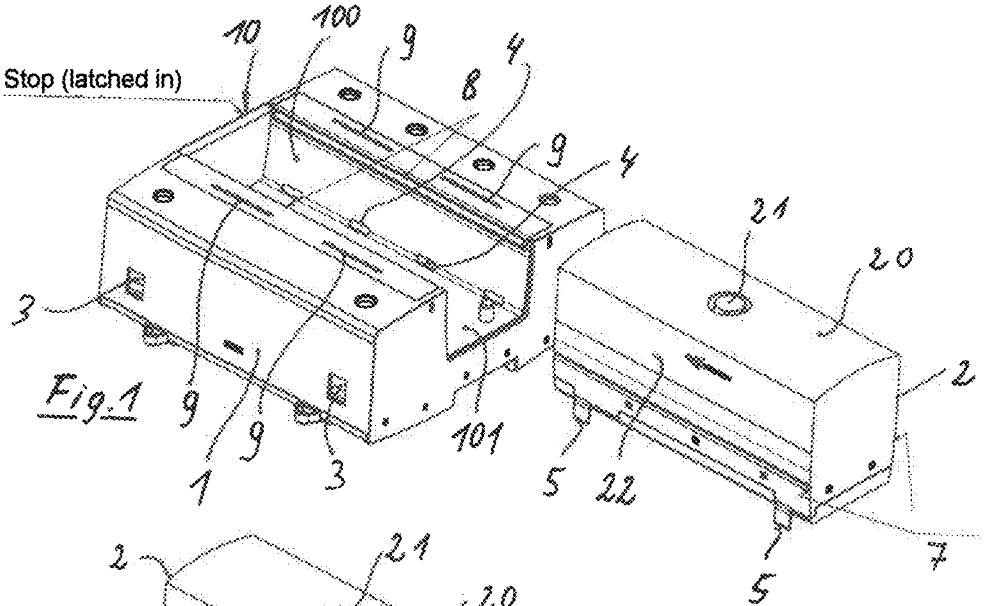
FIGS. 1-3 show the sequence of the plug-in module being pushed laterally onto a base from the right.

FIGS. 1 to 3 show a sequence illustrating the possibility of pushing the plug-in module 2 in onto the base 1 from the right, to be precise using the guide grooves 7 in conjunction with the resilient guide rails 8.

Figure 8:
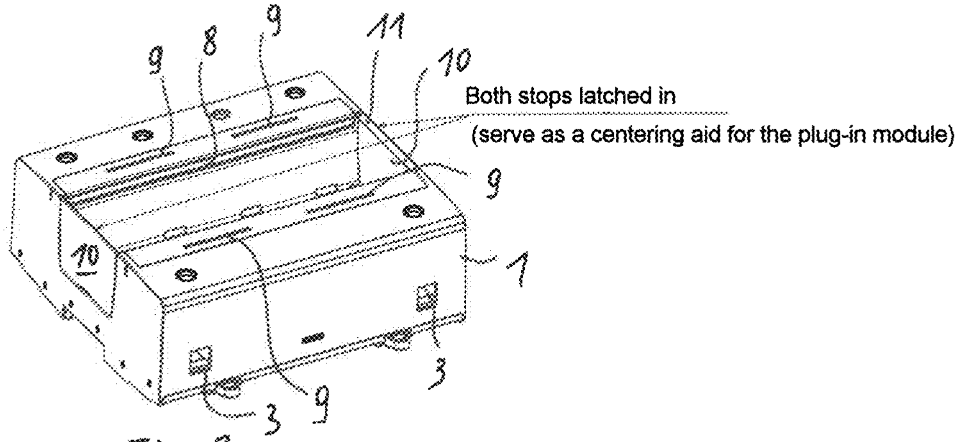
FIGS. 8-10 show illustrations relating to the plug-in module being plugged in the direction of the base from above, with isolation position (FIG. 9) and connecting position (FIG. 10)

The lateral pushing-in action of the plug-in module 2 can be delimited by a fixed or releasable stop 10, which is located in the base 1 or is inserted into the same. For the purpose of easy insertion of the plug-in module 2 from above (see FIGS. 8 to 10), it is possible for the stops 10 inserted on either side of the base to have a sloping surface 11, so that the plug-in module 2 can be plugged in more easily from above.

The respective stops 10 can be designed in the form of lateral delimiting walls which can be inserted in the base.

The lateral pushing-in action of the plug-in module 2 indicated in FIG. 1 takes place in the direction of the arrow according to FIG. 1, as far as the stop 10.

Thereafter, rotation of the spindle 6 (see FIG. 3) makes it possible for the plug-in module 2 to be fully fixed in electrical and mechanical terms in the base.

Figure 5:
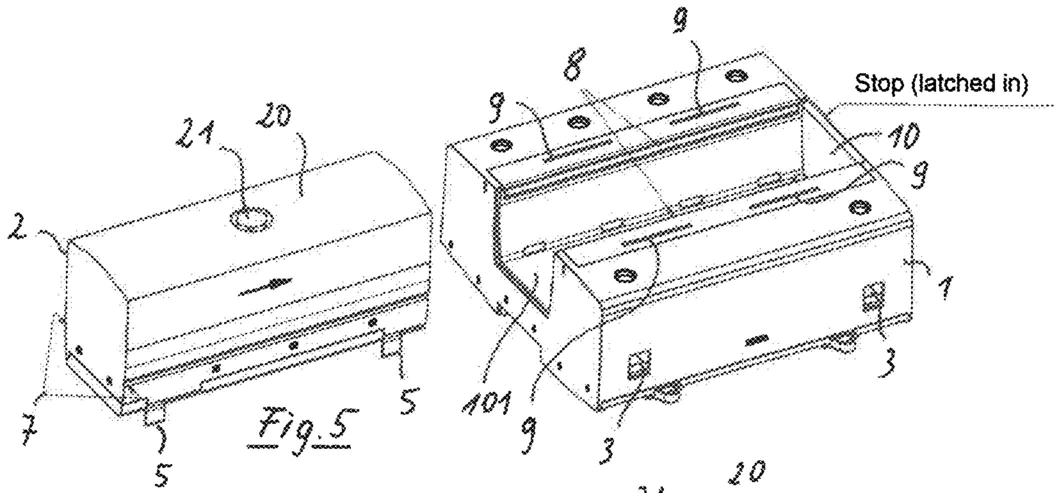
FIGS. 5-7 show illustrations of the plug-in module being pushed in the direction of the base from the left.

The possible pushing-in movement of the plug-in module 2 is formed adequately from the left, as illustrated in FIGS. 5 to 7.

In an alternative manner, the respective plug-in module 2 can also be inserted into a plug-in part 1 classically from above.

In this case, first of all plug-in operation takes place from above until the resilient guide rails 8 in the base 1 engage in the associated guide grooves 7 in the plug-in module 2, as is illustrated in FIG. 9. The isolation position can be seen here in the viewing window 9.

Subsequent rotation of the spindle gives rise to the plug-in module 2 moving further in the direction of the base 1. The resilient guide rails 9 here are pushed into associated set-back portions in the corresponding side wall 100, and therefore the screwing-in movement of the plug-in module 2 is carried out until the full end position, with reliable electrical connection established, is reached. In this respect, the display in the viewing window 9 then changes.

The viewing window 9 is supplemented by at least one further, end-side viewing window 90 in the base 1, in which case it is possible to see, in all circumstances, whether the plug-in module is electrically isolated or whether the desired contact connection in relation to the base has been achieved.

FIG. 12 shows a cross-sectional illustration through a device combination comprising a base 1 and a plug-in module 2, which can be fixed in the base 1 and can be rotated or pivoted about its axis, the device combination being illustrated in the first instance in the working position with closed contact actions between plug-in contacts 500, designed in the form of spring contacts, and contact tongues 5, wherein the arrows symbolize the direction of rotary or pivoting movement which is necessary in order to reach the idle position, that it to say the isolation/disengagement position.

When the isolation/disengagement position has been reached, latching-action fixing takes place. This is achieved with recourse to latching recesses 100, which are provided on the plug-in part 2, in particular on the housing thereof, in conjunction resiliently mounting latching noses 101, which are realized so as to be guided on the base. The fact that the plug-in contacts and mating plug-in contacts have reached the isolation/disengagement position, or departed from the same, can be detected by switching devices 102 and possibly fed to a telecommunication means. A further position switch 102 is located in the lower region of the base and indicates the working position.

The illustration according to FIG. 13 is based on a further embodiment of the teaching according to the invention, with a cylinder 200 which can be activated for example hydraulically.

In the retracted state of the cylinder 200, the plug-in part 2 is located in the base, to be precise in the working position.

With the cylinder 200 extended (illustrated by arrows and dashes according to FIG. 13), the plug-in part 1 is raised, and therefore the plug-in contacts 500 and the contact tongues 5 disengage from one another.

In this isolation/disengagement position, once again, the plug-in part 2 is fixed with recourse to recesses 100, which are provided or made on the plug-in part, in conjunction with latching noses 101. Position switches 102 can also be provided in this exemplary embodiment, in order to make it possible to draw a distinction between the working position having been reached or the isolation/disengagement position having been achieved.

The invention claimed is:

1. A device combination for protecting electrical networks against overvoltages or overcurrents, comprising an essentially U-shaped base and at least one plug-in module, which can be plugged or pushed onto the base, wherein the base has connection terminals for connecting to the respective network and also has plug-in contacts, which are connected to the connection terminals and are complementary to mating plug-in contacts or contact tongues of the plug-in module, and the plug-in module has a housing which accommodates one or more lightning and/or overvoltage arresters, and the mating plug-in contacts or contact tongues pass through a floor side of the housing, comprising:

means for changing the position and the distance between the plug-in contacts and mating plug-in contacts or contact tongues from a working position, with a closed, surge-current-resistant electrical connection between the plug-in module and base, to an idle position, in which the plug-in contacts and mating plug-in contacts or contact tongues are located in an isolation/disengagement position, with a distance between them corresponding to a necessary electrical separation distance and necessary creepage distances and clearances, the plug-in module nevertheless still being retained or fixed on the base, wherein the plug-in module is rotatable or pivotable, wherein a selection can be made between the working position and the idle position by pivoting or rotating the plug-in module.

2. A device combination for protecting electrical networks against overvoltages or overcurrents, comprising an essentially U-shaped base and at least one plug-in module, which can be plugged or pushed onto the base, wherein the base has connection terminals for connecting to the respective network and also has plug-in contacts, which are connected to the connection terminals and are complementary to mating plug-in contacts or contact tongues of the plug-in module, and the plug-in module has a housing which accommodates one or more lightning and/or overvoltage arresters, and the mating plug-in contacts or contact tongues pass through a floor side of the housing, comprising:

means for changing the position and the distance between the plug-in contacts and mating plug-in contacts or contact tongues from a working position, with a closed, surge-current-resistant electrical connection between the plug-in module and base, to an idle position, in which the plug-in contacts and mating plug-in contacts or contact tongues are located in an isolation/disengagement position, with a distance between them corresponding to a necessary electrical separation distance and necessary creepage distances and clearances, the plug-in module nevertheless still being retained or fixed on the base, wherein a pneumatically or hydraulically activatable ram or pad or lever is arranged between the plug-in module, or the housing thereof, and the base, which is configured and operable to bring about a change in the distance between contacts and to effect a change in position from the working position to the idle position.

3. A device combination for protecting electrical networks against overvoltages or overcurrents, comprising an essentially U-shaped base and at least one plug-in module, which can be plugged or pushed onto the base, wherein the base has connection terminals for connecting to the respective network and also has plug-in contacts, which are connected to the connection terminals and are complementary to mating plug-in contacts or contact tongues of the plug-in module, and the plug-in module has a housing which accommodates one or more lightning and/or overvoltage arresters, and the mating plug-in contacts or contact tongues pass through a floor side of the housing, comprising:

means for changing the position and the distance between the plug-in contacts and mating plug-in contacts or contact tongues from a working position, with a closed, surge-current-resistant electrical connection between the plug-in module and base, to an idle position, in which the plug-in contacts and mating plug-in contacts or contact tongues are located in an isolation/disengagement position, with a distance between them corresponding to a necessary electrical separation distance and necessary creepage distances and clearances, the plug-in module nevertheless still being retained or fixed on the base, wherein a spindle configured for converting a rotary movement into a longitudinal movement is arranged between the base and the plug-in module such that the plug-in module can be moved in the direction of the base, and away from the base, and is retained in the respective position in order both to establish a reliable electrical plug-in connection between the plug-in contacts and the mating plug-in contacts and to effect defined isolation by way of contact separation.

4. The device combination as claimed in claim 3, wherein the spindle is mounted in a rotatable manner in the plug-in module and is accessible from the upper side of the plug-in module, and a threaded bore which complements the spindle is arranged in the base.

5. The device combination as claimed in claim 3, wherein said base includes at least one side wall and said plug-in module includes side surfaces oriented toward the U-shaped base, at least one of the side surfaces has a guide groove which is complementary to a guide protrusion or a guide rail on at least one side wall of the U-shaped base, wherein the guide protrusion or the guide rail is mounted resiliently or inserted resiliently in the side wall such that when the plug-in module moves in the direction of the base floor or upward away from the base floor, the guide protrusion or the guide rail is displaced in the direction of the side wall and, when it reaches a congruent position in relation to the guide groove in the plug-in module, the guide protrusion or the guide rail enters into said groove, wherein the change in position of the guide protrusion or of the guide rail can be seen in a viewing window in the base.

6. The device combination as claimed in claim 5, wherein when the plug-in module reaches a position within the base which is defined by the guide protrusion or the guide rail entering into the guide groove, contact separation has been achieved.

7. The device combination as claimed in claim 5, wherein the plug-in module can be pushed laterally into the U-shaped base-by means of the guide groove and the guide protrusion or the guide rail and then, by means of the spindle, the plug-in module can move in the direction of the base floor for contact-making purposes.

8. The device combination as claimed in claim 7, wherein the lateral pushing-in action is delimited by a fixed or releasable stop, which is located in the base.

9. The device combination as claimed in claim 8, wherein the stop or stops is or are defined in the form of lateral delimiting walls which can be inserted in the base.

10. The device combination as claimed in claim 9, wherein on their upper side, the delimiting walls have a centering slope for easier introduction of the plug-in module from above in the direction of the base.

11. The device combination as claimed in claim 5, wherein a first viewing window is formed in the base in the plug-in direction of the plug-in module and a second viewing window is formed in the base in the pushing-in direction of the plug-in module.

12. The device combination as claimed in claim 4, wherein said base includes at least one side wall and said plug-in module includes side surfaces oriented toward the U-shaped base, at least one of the side surfaces has a guide groove-which is complementary to a guide protrusion or a guide rail on at least one side wall of the U-shaped base, wherein the guide protrusion or the guide rail is mounted resiliently or inserted resiliently in the side wall-such that when the plug-in module moves in the direction of the base floor or upward away from the base floor, the guide protrusion or the guide rail is displaced in the direction of the side wall and, when it reaches a congruent position in relation to the guide groove in the plug-in module, the guide protrusion or the guide rail enters into said groove, wherein the change in position of the guide protrusion or of the guide rail can be seen in a viewing window in the base.

13. The device combination as claimed in claim 6, wherein the plug-in module-can be pushed laterally into the U-shaped base by means of the guide groove and the guide protrusion or the guide rail and then, by means of the spindle, the plug-in module can move in the direction of the base floor for contact-making purposes.

14. The device combination as claimed in claim 10, wherein a first viewing window is formed in the base in the plug-in direction of the plug-in module and a second viewing window is formed in the base in the pushing-in direction of the plug-in module.

* * * * *